United States Patent
Ferguson et al.

(10) Patent No.: US 11,370,718 B2
(45) Date of Patent: *Jun. 28, 2022

(54) COMPACTED MURIATE OF POTASH FERTILIZERS CONTAINING MICRONUTRIENTS AND METHODS OF MAKING SAME

(71) Applicant: The Mosaic Company, Plymouth, MN (US)

(72) Inventors: Del Ferguson, Moose Jaw (CA); Ronald Olson, Valrico, FL (US); Carey Heinbigner, Moose Jaw (CA)

(73) Assignee: The Mosaic Company, Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,516

(22) Filed: Mar. 22, 2019

(65) Prior Publication Data
US 2019/0292111 A1    Sep. 26, 2019

Related U.S. Application Data

(63) Continuation of application No. 15/050,659, filed on Feb. 23, 2016, now abandoned, which is a
(Continued)

(51) Int. Cl.
*C05D 1/00* (2006.01)
*C05D 1/02* (2006.01)
(Continued)

(52) U.S. Cl.
CPC .................. *C05D 1/00* (2013.01); *C05B 7/00* (2013.01); *C05B 13/06* (2013.01); *C05D 1/02* (2013.01); *C05D 9/02* (2013.01); *C05G 5/12* (2020.02)

(58) Field of Classification Search
CPC ....................................................... C05D 9/02
See application file for complete search history.

(56) References Cited

U.S. PATENT DOCUMENTS 2,935,387 A    5/1960    Phillips et al.
3,005,696 A    10/1961    Higuett et al.
(Continued)

FOREIGN PATENT DOCUMENTS

CN    1417170 A    5/2003
CN    101648838 A    2/2010
(Continued)

OTHER PUBLICATIONS

Application and File History for U.S. Appl. No. 13/567,645, filed Aug. 6, 2012, inventors Ferguson et al.
(Continued)

*Primary Examiner* — Wayne A Langel
(74) *Attorney, Agent, or Firm* — Patterson Thuente Pedersen, P.A.

(57) ABSTRACT

A granular cohered MOP fertilizer having one or more micronutrients, and one or more binding ingredients. The fertilizer is prepared by compacting MOP feed material with a source of zinc and one or more optional binders to form a cohered MOP composition. The cohered MOP composition is then further processed, such as by crushing and sizing, to form a cohered granular MOP product containing a source of zinc. The process yields a fertilizer product containing micronutrients with superior elemental and granule size distribution without compromising handling or storage qualities.

18 Claims, 9 Drawing Sheets
(7 of 9 Drawing Sheet(s) Filed in Color)

Related U.S. Application Data continuation of application No. 13/567,645, filed on Aug. 6, 2012, now Pat. No. 9,266,784.

(60) Provisional application No. 61/514,952, filed on Aug. 4, 2011.

(51) Int. Cl.
| | | |
|---|---|---|
| C05D 9/02 | (2006.01) | |
| C05G 5/12 | (2020.01) | |
| C05B 13/06 | (2006.01) | |
| C05B 7/00 | (2006.01) | |

(56) References Cited

U.S. PATENT DOCUMENTS

| | | | |
|---|---|---|---|
| 3,135,473 A | 6/1964 | Schrader et al. | |
| 3,560,381 A | 2/1971 | Winters et al. | |
| 3,655,357 A | 4/1972 | Ray | |
| 3,794,478 A * | 2/1974 | Dirksen | C05D 1/02 |
| | | | 71/1 |
| 3,961,932 A | 6/1976 | Miller | |
| 4,025,329 A | 5/1977 | Goertz | |
| 4,045,204 A | 8/1977 | Matsunaga et al. | |
| 4,154,593 A | 5/1979 | Brown et al. | |
| 4,332,609 A | 6/1982 | Ott | |
| 4,758,261 A | 7/1988 | Parker et al. | |
| 4,789,391 A | 12/1988 | Detroit | |
| 4,797,265 A | 1/1989 | Inoue et al. | |
| 4,832,728 A | 5/1989 | Allan et al. | |
| 5,120,345 A | 6/1992 | Kayaert et al. | |
| 5,630,861 A | 5/1997 | Yaniv | |
| 5,653,782 A | 8/1997 | Stern et al. | |
| 6,179,893 B1 | 1/2001 | Bendix et al. | |
| 6,241,796 B1 | 6/2001 | Jardine et al. | |
| 6,254,655 B1 | 7/2001 | Goertz | |
| 6,379,414 B1 | 4/2002 | Kleine-Kleffmann et al. | |
| 6,517,600 B1 | 2/2003 | Dinel | |
| 6,544,313 B2 | 4/2003 | Peacock et al. | |
| 6,936,087 B2 | 8/2005 | Wommack et al. | |
| 7,497,891 B2 | 3/2009 | Peacock | |
| 7,727,501 B2 * | 6/2010 | Ferguson | C01D 3/22 |
| | | | 264/176.1 |
| 7,789,932 B2 | 9/2010 | Anderson et al. | |
| 8,282,898 B2 | 10/2012 | Phinney | |
| 8,323,371 B2 | 12/2012 | Phinney | |
| 9,266,784 B2 * | 2/2016 | Ferguson | C05D 1/02 |
| 2002/0178772 A1 | 12/2002 | Hince | |
| 2004/0237615 A1 | 12/2004 | Green | |
| 2005/0036929 A1 | 2/2005 | Ferguson et al. | |
| 2006/0084573 A1 | 4/2006 | Grech et al. | |
| 2009/0048319 A1 | 2/2009 | Kohle et al. | |
| 2009/0078014 A1 | 3/2009 | Yamashita | |
| 2009/0270257 A1 | 10/2009 | Pursell | |
| 2010/0040882 A1 | 2/2010 | Phinney | |
| 2010/0240533 A1 | 9/2010 | Varadachari | |
| 2010/0291237 A1 | 11/2010 | Cook | |
| 2011/0214465 A1 | 9/2011 | Peacock et al. | |
| 2012/0036906 A1 | 2/2012 | Pedersen | |
| 2012/0067094 A1 | 3/2012 | Pursell et al. | |
| 2013/0031943 A1 | 2/2013 | Ferguson et al. | |
| 2013/0143737 A1 | 6/2013 | Varadachari | |
| 2013/0219979 A1 | 8/2013 | Deb | |
| 2013/0230605 A1 | 9/2013 | Ceulemans et al. | |
| 2014/0007633 A1 | 1/2014 | Tang et al. | |
| 2014/0083148 A1 | 3/2014 | Kuo et al. | |
| 2014/0109639 A1 | 4/2014 | Taylor et al. | |
| 2014/0260467 A1 | 9/2014 | Peacock et al. | |
| 2014/0274719 A1 | 9/2014 | Davison | |
| 2015/0158776 A1 | 6/2015 | Wells | |
| 2016/0168040 A1 | 6/2016 | Ferguson et al. | |
| 2017/0283334 A1 | 10/2017 | Rohrer et al. | |
| 2018/0290940 A1 | 10/2018 | McLaughlin et al. | |

FOREIGN PATENT DOCUMENTS

| | | |
|---|---|---|
| CN | 104163709 A | 11/2014 |
| EP | 2248790 A1 | 11/2010 |
| EP | 2258159 A2 | 12/2010 |
| RU | 2182142 C1 | 5/2002 |
| SU | 10022774 A1 | 3/1983 |
| SU | 1428748 A1 | 10/1988 |
| WO | WO-2012063091 A1 | 5/2012 |
| WO | WO-2013019935 A2 | 2/2013 |

OTHER PUBLICATIONS

Application and File History for U.S. Appl. No. 15/050,659, filed Feb. 23, 2016, inventors Ferguson et al.
Extended European Search Report for Application No. 12819517.9, dated Mar. 23, 2015, 6 pages.
International Preliminary Reporton Patentability for Application No. PCT/US2012/049301, dated Feb. 13, 2014, 7 pages.
International Search Report and Written Opinion for Application No. PCT/US2012/049301, dated Feb. 22, 2013, 10 pages.
International Search Report and Written Opinion for Application No. PCT/US2014/028565, dated Jul. 28, 2014, 10 pages.
Kali, "Korn-Kali®+B," Technical Data Sheet, Version 2.2, Mar. 15, 2012, 1 page.
Kali, "Malaysia and Indonesia: Korn-Kali+B—A Four Nutrient Fertiliser for the Oil Palm," The Authority in Potassium and Magnesium, Dec. 17, 2008, 2 pages.
Mosaic Agri Facts, "Aspire," Printout from web page www.aspirepotash.com/performance, last visited Sep. 23, 2015, 7 pages.
Office Action dated Dec. 1, 2014 for Chinese Application No. 201280049326.2, filed Aug. 2, 2012, 3 pages.
Office Action dated Aug. 2, 2016 for Australian Application No. 2012290064, filed Aug. 12, 2012, 3 pages.
Office Action dated Jun. 3, 2016 for New Zealand Application No. 720205, filed May 16, 2016, 2 pages.
Office Action dated Jul. 4, 2016 for Chinese Application No. 201280049326.2, filed Aug. 2, 2012, 7 pages.
Office Action dated Sep. 14, 2015 for New Zealand Application No. 620866, filed Aug. 2, 2012, 2 pages.
Office Action dated Aug. 16, 2016 for Chilean Application No. 201400279, filed Feb. 4, 2014, 8 pages.
Office Action dated Jan. 17, 2017 for Chilean Application No. 201400279, filed Feb. 4, 2014, 8 pages.
Office Action dated Mar. 17, 2016 for New Zealand Application No. 620866, filed Aug. 2, 2012, 2 pages.
Office Action dated Nov. 17, 2014 for New Zealand Application No. 620866, filed Aug. 2, 2012, 2 pages.
Office Action dated Aug. 22, 2014 for Canadian Application No. 2,784,661, filed Aug. 2, 2012, 3 pages.
Office Action dated Jun. 25, 2015 for Canadian Application No. 2,784,661, filed Aug. 2, 2012, 3 pages.
Office Action dated Apr. 26, 2016 for Japanese Application No. 2014-524067, filed Aug. 2, 2012, 5 pages.
Office Action dated Apr. 28, 2017 for Malaysian Application No. PI2014000305, filed Aug. 2, 2012, 3 pages.
Office Action dated Feb. 29, 2016 for Canadian Application No. 2,784,661, filed Aug. 2, 2012, 3 pages.
Office Action dated Jun. 30, 2015 for Chinese Application No. 201280049326.2, filed Aug. 2, 2012, 3 pages.
Office Action dated Oct. 31, 2016 for Russian Application No. 2014108161, filed Aug. 2, 2012, 6 pages.
Office Action dated Dec. 28, 2016 for Israeli Application No. 230764, filed Feb. 2, 2014, 2 pages.
Swift Brochure, known to Applicant at least as of Nov. 19, 2013, 3 pages.
Office Action dated Oct. 31, 2018 for Indian Application No. 8056/DELNP/2015, 5 pages.
Office Action dated Apr. 23, 2018 for Chinese Application No. 20140014742.8, 14 pages.
Office Action dated Aug. 2, 2018 for Belarus Application No. a20140139, 7 pages.

(56) References Cited

OTHER PUBLICATIONS

Office Action dated Aug. 16, 2018 for EP Application No. 12819517.9, 5 pages.
Office Action dated Mar. 26, 2018 for Mexican Application No. MX/a/2014/001394, 3 pages.
Office Action dated Mar. 1, 2018 for Russian Application No. 2015143988, 8 pages.
Office Action dated Jan. 4, 2018 for Indian Application No. 1046/DELN/2014, 6 pages.
Office Action dated Jan. 2, 2018 for Israeli Application No. 241046, 3 pages.
Office Action dated Dec. 14, 2017 for Australian Application No. 2014236424, 3 pages.
Office Action dated Decembers, 2017 for Belarus Application No. a20140139, 4 pages.
Office Action dated Oct. 12, 2017 for Mexican Application No. MX/a/2014/001394, 4 pages.
Office Action dated Jun. 23, 2017 for Mexican Application No. MX/a/2014/001394, 4 pages.
PCT Search Report and Written Opinion dated Jul. 26, 2018 for PCT Application No. PCT/US2018/025499, 11 pages.
Office Action dated Sep. 6, 2018 for Indonesia Application No. P00201401234, 4 pages.
Office Action dated Dec. 19, 2018 for Chinese Application No. 20140014742.8, 4 pages.
Office Action dated May 21, 2019 for Chinese Application No. 20140014742.8, 8 pages.
Office Action dated Jan. 23, 2020 for Chilean Application No. 201400279, 5 pages.
Application and File history for U.S. Appl. No. 14/212,456, filed Mar. 14, 2014. Inventors: Peacock et al.
Application and File history for U.S. Appl. No. 15/943,161, filed Apr. 2, 2018. Inventors: McLaughlin et al.
Communication dated Mar. 17, 2020 for EP Application No. 12819517.9, 5 pages.
Office Action dated Jun. 10, 2020 for Indonesia Application No. P00201901460, 4 pages.
Office Action dated Jul. 2, 2020 for Belarus Application No. a20180402, 4 pages.
Office Action dated Nov. 19, 2020 for Brazilian Application No. 1220190225702, 3 pages.
Office Action dated Nov. 19, 2020 for Indonesia Application No. P00201901460, 4 pages.
Office Action dated Dec. 24, 2020 for Belarus Application No. a20180502, 7 pages.
Fares et al., "Irrigation Systems and Nutrient Sources for Fertigation," Soil and Crop Management, May 2009, 4 pages.

* cited by examiner

COMPACTED MURIATE OF POTASH FERTILIZERS CONTAINING MICRONUTRIENTS AND METHODS OF MAKING SAME

RELATED APPLICATIONS

This application is a continuation of application Ser. No. 15/050,659 filed Feb. 23, 2016, which in turn is a continuation of application Ser. No. 13/567,645 filed Aug. 6, 2012, now U.S. Pat. No. 9,266,784 issued Feb. 23, 2016, which claims the benefit of U.S. Provisional Application No. 61/514,952 filed Aug. 4, 2011, each of which is hereby fully incorporated herein by reference.

FIELD OF THE INVENTION

The invention relates generally to fertilizer compositions. More specifically, the invention relates to the entrainment of micronutrients into muriate of potash fertilizers via compaction processes.

BACKGROUND OF THE INVENTION

Essential plant nutrients include primary nutrients, secondary or macronutrients, and trace or micronutrients. Primary nutrients include carbon, hydrogen, oxygen, nitrogen, phosphorous, and potassium. Carbon and oxygen are absorbed from the air, while other nutrients including water (source of hydrogen), nitrogen, phosphorous, and potassium are obtained from the soil. Fertilizers containing sources of nitrogen, phosphorous, and/or potassium are used to supplement soils that are lacking in these nutrients.

According to the conventional fertilizer standards, the chemical makeup or analysis of fertilizers is expressed in percentages (by weight) of the essential primary nutrients nitrogen, phosphorous, and potassium. More specifically, when expressing the fertilizer formula, the first figure represents the percent of nitrogen expressed on the elemental basis as "total nitrogen" (N), the second figure represent the percent of phosphorous expressed on the oxide basis as "available phosphoric acid" ($P_2O_5$), and the third figure represents the percent of potassium also expressed on the oxide basis as "available potassium oxide" ($K_2O$), or otherwise known as the expression ($N$—$P_2O_5$—$K_2O$).

Even though the phosphorous and potassium amounts are expressed in their oxide forms, there is no $P_2O_5$ or $K_2O$ in fertilizers. Phosphorus exists most commonly as monocalcium phosphate, but also occurs as other calcium or ammonium phosphates. Potassium is ordinarily in the form of potassium chloride or sulfate. Conversions from the oxide forms of P and K to the elemental expression ($N$—$P$—$K$) can be made using the following formulas:

$$\% P = \% P_2O_5 \times 0.437 \quad \% K = \% K_2O \times 0.826$$

$$\% P_2O_5 = \% P \times 2.29 \quad K_2O = \% K \times 1.21$$

Muriate of potash (MOP), otherwise known as potassium chloride, KCl, is an agricultural fertilizer, and is the most common source of fertilizer potassium. MOP is typically extracted from naturally occurring underground mineral sources either by conventional mining or solution mining techniques. Once extracted, MOP can be processed into a number of different finished forms or KCl products suitable for specific industrial, chemical, human or animal nutrients or agricultural applications as desired by individual customers.

Finished MOP, for the purpose of agricultural consumption, is typically sold in a granular form. The purity and granule size may vary depending on the end use to which the product will be put. The granules are produced using crushing and sizing processes known to one of ordinary skill in the art, such as by compaction and the subsequent crushing and sizing which thereby break up the larger pieces of MOP into smaller granules. Compaction implies the continuous rolling of MOP feed material at elevated pressures yielding cohesion of material in the resultant product. The grading of MOP, and hence its market value, is also dependent on both the purity and granule size of the product. Typically the MOP is screened to the desired particle size for a particular need.

A typical MOP feed stock has a granule size that is comparable to table salt, which is less than the desired granule size. In order to obtain larger granules, this feedstock is first compacted using a compacting process such as a simple roll compacter or the like to produce a sheet-like cohered product. Subsequent processing typically involves controlled breakage of the MOP sheet into granules, which are then sorted to a desired size range by screening or other classification methods known in the industry. A non-limiting example of a standard industry known roll compactor is K.R. Komarek's B220B Compactor (or any of the "B" models or high pressure briquetting and compacting machines) available from K.R. Komarek, Inc. of Wood Dale, Ill.

In addition to the primary nutrients, such as potassium that is made available to plants via the MOP fertilizer added to soil, micronutrients and secondary nutrients are also essential for plant growth. These are required in much smaller amounts than those of the primary nutrients. Secondary nutrients can include, but are not limited to, sulfur ($SO_4$), calcium (Ca), magnesium (Mg) or combinations thereof. Micronutrients can include, but are not limited to, for example, boron (B), zinc (Zn), manganese (Mn), nickel (Ni), molybdenum (Mo), copper (Cu), iron (Fe), chlorine (Cl), or combinations thereof. From this point forward and throughout the specification, for the sake of simplicity, the term "micronutrient" refers to and includes both secondary nutrients and micronutrients.

A common method of micronutrient application for crops is soil application. Recommended application rates usually are less than 10 lb/acre on an elemental basis. Separate micronutrient applications at these low rates are difficult and are prone to result in the poor uniformity of distribution. Including micronutrients with mixed fertilizers is a convenient method of application and some methods allow more uniform distribution with conventional application equipment. Costs also are reduced by eliminating a separate application step. Four methods of applying micronutrients with mixed fertilizers can include incorporation during manufacture, bulk blending with granular fertilizers, coating onto granular fertilizers and seeds, and mixing with liquid herbicides or fluid fertilizers.

Bulk blending with granular fertilizers is the practice of bulk blending micronutrient compounds with phosphate, nitrogen and potash fertilizers. The main advantage to this practice is that fertilizer grades can be produced which will provide the recommended micronutrient rates for a given field at the usual fertilizer application rates. The main disadvantage is that segregation of nutrients can occur during the blending operation and with subsequent handling. Micronutrients are often small in particle size which can result in segregation in a bulk blend. In order to reduce or prevent size segregation during handling and transport, the ideal micronutrient granules must be close to the same size as the phosphate, nitrogen and potash granules. Because the micronutrients are required in very small amounts for plant nutrition, this practice has resulted in granules of micronutrients unevenly distributed and generally too far from most of the plants to be of immediate benefit as most micronutrient elements migrate in soil solution only a few millimeters during an entire growing season.

Coatings decrease the possibility of segregation. However, some surface binding materials are unsatisfactory because they do not maintain the micronutrient coatings during bagging, storage, and handling, which results in segregation of the micronutrient sources from the granular fertilizer components.

Steps have been taken to reduce the segregation problem for example as in the case of sulfur or sulfur platelets in the fertilizer portion as described in U.S. Pat. No. 6,544,313 entitled "Sulfur-Containing Fertilizer Composition and Method for Preparing Same" and in the case of micronutrients as described in U.S. Pat. No. 7,497,891 entitled, "Method for Producing a Fertilizer with Micronutrients," both of which are incorporated by reference in their entireties. This preparation method, however, is directed to a granulation process.

Some micronutrient pelletizing and compaction applications exist in such products as sodium chloride (salt) and kieserite (magnesium sulfate monohydrate); however the inclusion of micronutrients into a primary nutrient, such as MOP, using a roll compactor is not known in the prior art to the inventors' knowledge.

Micronutrient addition has historically been performed in downstream operations outside the processing boundaries of MOP miners and millers. There is a well-documented long term need to increase crops yields in order to feed an ever-increasing world population. Therefore, there remains a need to economically create a compacted, crushed and sized, granular MOP value-added fertilizer product that contains one or more micronutrients that maximizes the introduction of the micronutrient(s) into soil solution and ultimately to the root zone of plants.

SUMMARY OF THE INVENTION

Embodiments of the invention include a cohered granular MOP fertilizer having one or more micronutrients, such as, but not limited to, boron (B), zinc (Zn), manganese (Mn), molybdenum (Mo), nickel (Ni), copper (Cu), iron (Fe), chlorine (Cl), sulfur (S) in its elemental form, sulfur in its oxidized sulfate form ($SO_4$) and combinations thereof at various concentrations. The fertilizer can also include a compaction aid, coloring agent, and/or one or more binding ingredients such as sodium hexametaphosphate (SHMP). Micronutrients, when compacted into MOP remain soluble and dissolve readily when applied using standard fertilizer practices.

According to embodiments of the invention, the fertilizer is prepared by compacting MOP feed material with one or more micronutrients and one or more optional binders to form a cohered MOP product. The cohered MOP product is then further processed, such as by crushing and sizing, to form a cohered granular MOP product containing micronutrients. The process yields a fertilizer product containing micronutrients with superior or more uniform elemental and granule size distribution, without compromising handling or storage qualities, compared to the aforementioned micronutrient applications. The uniformity of distribution of a fertilizer containing micronutrients compared to existing methods of dry application allow individual plants better access to the nutrients.

The above summary of the invention is not intended to describe each illustrated embodiment or every implementation of the present invention. The detailed description that follows more particularly exemplifies these embodiments.

BRIEF DESCRIPTION OF THE DRAWINGS

The patent or application file contains at least one drawing executed in color. Copies of this patent with color drawing(s) will be provided by the Patent and Trademark Office upon request and payment of the necessary fee.

Figure 1:
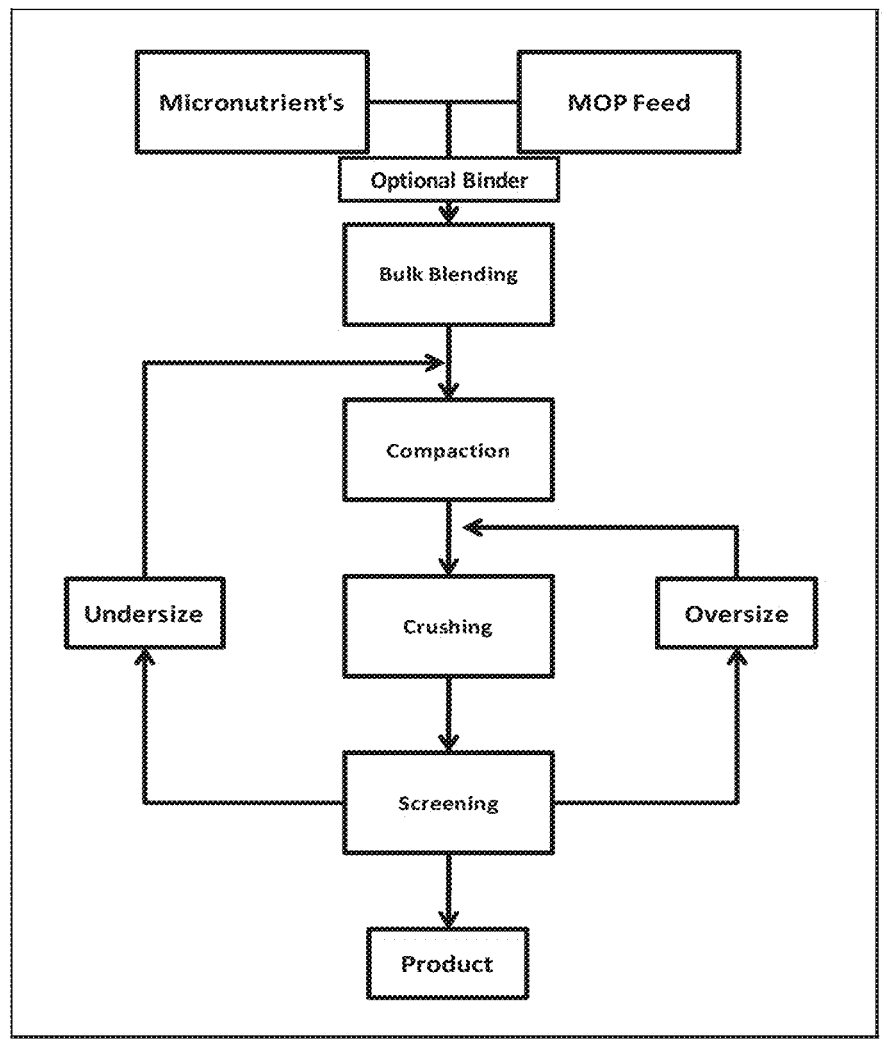
FIG. 1 is the process flow sheet for the injection of micronutrients into an MOP feed.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

A cohered fertilizer granular product according to embodiments of the invention generally includes a MOP fertilizer base and one or more micronutrients (or secondary nutrients), including, but not limited to, boron (B), zinc (Zn), manganese (Mn), molybdenum (Mo), nickel (Ni), copper (Cu), iron (Fe), chlorine (Cl), sulfur (S) in its elemental form, sulfur in its oxidized sulfate form ($SO_4$), or combinations thereof at various concentrations. As discussed above, the term "micronutrients" refers to and includes both secondary nutrients and micronutrients. The concentration of one or more micronutrients can range from about 0.001 to about 99.99 weight percent and more particularly from about 0.001 to about 10 weight percent.

The MOP fertilizer base can be any of a variety of commercially available MOP sources, such as, but not limited to, for example, an MOP feed material having a $K_2O$ content (on the $N$—$P_2O_5$—$K_xO$ scale) ranging from about 20 weight percent to about 80 weight percent. In one particular non-limiting example, the chemical analysis of the MOP feed material is 0-0-60 wt %; in another non-limiting example, the chemical analysis of the MOP feed material is 0-0-62 wt %, and in yet another non-limiting example, the chemical analysis of the MOP feed material is 0-0-55 wt %.

The fertilizer can also include one or more binding agents or ingredients in order to improve the strength or handling ability of the finished compacted granular MOP product so that the granules are less likely to wear or break down during handling or transport, as described in U.S. Pat. No. 7,727,501, entitled "Compacted granular potassium chloride, and method and apparatus for production of same," incorporated herein by reference in its entirety. A binding agent is a chemical that is added into the feed of a compaction circuit to improve the strength and quality of compacted particles. The binding agent acts to sequester or chelate impurities in the MOP feedstock, while providing adhesive properties to the compacted blend. Binding agents can include, for example, sodium hexametaphosphate (SHMP), tetra-sodium pyrophosphate (TSPP), tetra-potassium pyrophosphate (TKPP); sodium tri-polyphosphate (STPP); di-ammonium phosphate (DAP), mono-ammonium phosphate (MAP), granular mono-ammonium phosphate (GMAP), potassium silicate, sodium silicate, starch, dextran, lignosulfonate, bentonite, montmorillonite, kaolin, or combinations thereof. In addition to or alternatively to the binding agents, some of the micronutrients themselves can act as binding agents to improve particle strength.

According to one embodiment of the invention, a cohered granular MOP fertilizer containing micronutrients is made by blending one or more micronutrients into the MOP feed of a compaction circuit. The micronutrients can be added to the feed in advance of compaction. The compaction of this blended MOP feed stock and then conventional further processing, such as crushing and sizing, yields cohered MOP fertilizer granules containing micronutrients that are evenly distributed throughout the granular product.

A production line or production circuit for producing compacted granular MOP generally includes a material feed apparatus such as a belt conveyor, pneumatic conveyor or the like which input various particulate MOP streams, screenings, recovered or discarded MOP material, one or more micronutrients, and one or more optional binding agents to a compactor. The compactor then presses the feed material at elevated pressure into a cohered MOP intermediate sheet or cake, which can then be crushed, classified, resized, or otherwise refinished into a desired finished MOP product.

FIG. 1 is a flow chart illustrating the steps involved in one contemplated embodiment of the method of production of the present invention. Specifically, FIG. 1 shows the injection of a micronutrient into the MOP feed of a production circuit. The micronutrient(s) can be added to the MOP feed material at various locations in the circuit by an injector including metering equipment to allow more precise control of the amounts of each component added per unit of MOP feedstock.

After addition of the micronutrient(s) and optionally binding agent(s) to the MOP feed material, the additives and MOP feed material are blended. The blending step can either take place passively, by allowing these materials to come together or blend during their joint carriage through the feed mechanism, or alternatively there may be specific blending equipment added to the MOP production circuit between the injector and the compactor to provide more aggressive or active blending of the micronutrient(s), optional binders, and MOP feedstock prior to compaction.

The blended MOP feed material, now properly mixed with the micronutrients is then compacted. The compaction process can be performed using conventional compaction equipment such as a roll compactor or the like. The cohered intermediate yielded can then be further processed into the desired finished granular product using methods such as crushing, screening or other conventional classification methods suitable to yield a finished product of the desired particle size or type. These steps are also shown in the flow diagram of FIG. 1.

In one particular embodiment of the invention, it is desirable to incorporate more than one different micronutrient in combination, and this could either be accomplished by the injection of a pre-blended combination of multiple micronutrients or else by the separate placement or injection of the desired amounts of the micronutrients into the MOP. It will be understood that any attendant process or equipment modifications to permit the addition of one or more micronutrients and/or binding agents, either concurrently or separately, to the MOP feedstock are contemplated within the scope of the present invention.

The following representative examples further define embodiments of the present invention.

EXAMPLE 1

A number of MOP fertilizer compositions compacted with various micronutrients were produced and evaluated for technical feasibility. MOP feed material supplied by Mosaic Hersey Potash Mine of Michigan, USA (hereinafter "Mosaic Hersey") was compacted with various micronutrients at different concentrations. The chemical analysis of the MOP was 98.8% by weight of KCl, 1.1% by weight of sodium chloride (NaCl), 283 ppm of calcium (Ca), 11 ppm of iron (Fe), 59 ppm of magnesium (Mg), and 287 ppm of sulfate ($SO_4$). The total moisture content of the MOP feed was 0.1439% by weight. The MOP feed material supplied by Mosaic Hersey is a 0-0-62% $K_2O$ product (expressed in terms of $N$—$P_2O_5$—$K_2O$) produced using solution mining techniques. The MOP feed material is white in color as is the inherent nature of MOP produced from the solution mining technique.

The micronutrients used in the production of the Hersey Micronutrient (HM) samples (Table 1 below) included boron (in the form of anhydrous borax $Na_2B_4O_7$), zinc (in the form of zinc sulfate monohydrate $ZnSO_4.H_2O$), zinc (in the form of zinc oxide ZnO), manganese (in the form of manganese sulfate $MnSO_4.H_2O$), and/or molybdenum (in the form of sodium molybdate dehydrate $Na_2MoO_4.2H_2O$).

The following compositions were produced (hereinafter "the HM products"):

TABLE 1

Test Run Micronutrient Description

| Sample | Micronutrient Compounds | Micronutrients (%) |
|---|---|---|
| HM3 | $Na_2B_4O_7$-anhydrous borax | 0.5% B |
| HM4 | $Na_2B_4O_7$-anhydrous borax | 0.7% B |
| HM5 | (#1) $Na_2B_4O_7$-anhydrous borax-<br>(#2) $Na_2MoO_4 \cdot 2H_2O$-sodium molybdate | 0.50% B—0.03% Mo |
| HM6 | (#1) $Na_2B_4O_7$-anhydrous borax-<br>(#2) $Na_2MoO_4 \cdot 2H_2O$-sodium molybdate | 0.70% B—0.08% Mo |
| HM8 | $MnSO_4 \cdot H_2O$-Manganous Sulphate monohydrate | 1% Mn |
| HM9 | (#1) $MnSO_4 \cdot H_2O$-Manganous Sulphate monohydrate-<br>(#2) $Na_2MoO_4 \cdot 2H_2O$-sodium molybdate | 1.00% Mn—0.03% Mo |
| HM10 | $MnSO_4 \cdot H_2O$-Manganous Sulphate monohydrate | 2% Mn |
| HM11 | Zinc Sulphate mono hydrate-$ZnSO_4 \cdot H_2O$ | 1% Zn |
| HM12 | Zinc Oxide-ZnO | 1% Zn |
| HM13 | (#1) Zinc Sulphate mono hydrate-$ZnSO_4 \cdot H_2O$-<br>(#2) $MnSO_4 \cdot H_2O$-Manganous sulphate monohydrate | 1% Zn—1% Mn |

Each product was generated using the same process flow sheet: The MOP and micronutrient(s) were blended in a batch mixing drum. The blended product was then delivered to the compaction circuit. The compaction circuit used included a compactor producing a sinusoidal flake, a flake breaker, a disintegrator (crusher) and a 2-deck vibratory screen providing a 4×10 Tyler Mesh product. Oversized and undersized granules were recycled for further processing.

Samples from each of the HM products were analyzed for $K_2O$ content by an outside independent laboratory. Table 2 displays the Analytical Values (independent lab) vs. theoretical $K_2O$ value (% Calc) based on the content of the micronutrient compound and the basis of a 62% $K_2O$ MOP feed.

TABLE 2

$K_2O$ Analysis of the HM Products

| Sample | Micronutrient Compounds | K2O (%) Calc | K2O (%) Analytical |
|---|---|---|---|
| HM3 | $Na_2B_4O_7$-anhydrous borax | 60.3 | 60.2 |
| HM4 | $Na_2B_4O_7$-anhydrous borax | 59.6 | 59.48 |
| HM5 | (#1) $Na_2B_4O_7$-anhydrous borax-<br>(#2) $Na_2MoO_4 \cdot 2H_2O$-sodium molybdate | 60.3 | 59.78 |
| HM6 | (#1) $Na_2B_4O_7$-anhydrous borax-<br>(#2) $Na_2MoO_4 \cdot 2H_2O$-sodium molybdate | 59.5 | 59.43 |
| HM8 | $MnSO_4 \cdot H_2O$-Manganous Sulphate monohydrate | 59.8 | 59.41 |
| HM9 | (#1) $MnSO_4 \cdot H_2O$-Manganous Sulphate monohydrate-<br>(#2) $Na_2MoO_4 \cdot 2H_2O$-sodium molybdate | 59.7 | 59.54 |
| HM10 | $MnSO_4 \cdot H_2O$-Manganous Sulphate monohydrate | 57.6 | 59.05 |
| HM11 | Zinc Sulphate mono hydrate-$ZnSO_4 \cdot H_2O$ | 60 | 60.07 |
| HM12 | Zinc Oxide-ZnO | 61.1 | 61.23 |
| HM13 | (#1) Zinc Sulphate mono hydrate-$ZnSO_4 \cdot H_2O$-<br>(#2) $MnSO_4 \cdot H_2O$-Manganous sulphate monohydrate | 57.8 | 57.91 |

Samples from each of the HM products were analyzed for micronutrient (boron, molybdenum, manganese and zinc) content by an outside independent laboratory. The micronutrients found in anhydrous borax, molybdate, manganese sulphate monohydrate and zinc sulphate monohydrate are effectively entrained in a compacted granule.

Results are Shown in Table 3.

TABLE 3

Micronutrients Analysis of the HM Products

| Sample | Micronutrient Compounds | Micronutrients (%) Addition | Micronutrients (%) Analytical |
|---|---|---|---|
| HM3 | $Na_2B_4O_7$-anhydrous borax | 0.5% B | 0.537% B |
| HM4 | $Na_2B_4O_7$-anhydrous borax | 0.7% B | 0.574% B |
| HM5 | (#1) $Na_2B_4O_7$-anhydrous borax-<br>(#2) $Na_2MoO_4 \cdot 2H_2O$-sodium molybdate | 0.50% B—0.03% Mo | 0.551% B—0.017% Mo |
| HM6 | (#1) $Na_2B_4O_7$-anhydrous borax-<br>(#2) $Na_2MoO_4 \cdot 2H_2O$-sodium molybdate | 0.70% B—0.08% Mo | 0.718% B—0.053% Mo |
| HM8 | $MnSO_4 \cdot H_2O$-Manganous Sulphate monohydrate | 1% Mn | 1.01% Mn |
| HM9 | (#1) $MnSO_4 \cdot H_2O$-Manganous Sulphate monohydrate-<br>(#2) $Na_2MoO_4 \cdot 2H_2O$-sodium molybdate | 1.00% Mn—0.03% Mo | 1.03% Mn—0.02% Mo |
| HM10 | $MnSO_4 \cdot H_2O$-Manganous Sulphate monohydrate | 2% Mn | 1.3% Mn |
| HM11 | Zinc Sulphate mono hydrate-$ZnSO_4 \cdot H_2O$ | 1% Zn | 0.93% Zn |
| HM12 | Zinc Oxide-ZnO | 1% Zn | 0.4% Zn |
| HM13 | (#1) Zinc Sulphate mono hydrate-$ZnSO_4 \cdot H_2O$-<br>(#2) $MnSO_4 \cdot H_2O$-Manganous sulphate monohydrate | 1.00% Zn—1.00% Mn | 0.89% Zn—0.95% Mn |

Quality Metrics

Each of the HM products was screened in order to perform a size analysis. Table 4 below displays standard fertilizer blending metrics including the Size Guide Number (SGN) and the Uniformity Index (UI) of each of the product streams along with a baseline. The formulas for these sizing metrics are as follows:

SGN=$d_{50}$ (μm)/10, or otherwise defined as the particle size in millimeters of which 50% by weight of the sample is coarser and 50% finer times 100

UI=[$d_5$ (μm)/1000)/($d_{90}$(μm)/1000)]*100, or otherwise defined as the particle size at which 95% of the material is retained, divided by the particle size at which 10% of the material is retained, multiplied by 100.

TABLE 4

SGN and UI of HM Products

|  | SGN | UI |
|---|---|---|
| Baseline | 307 | 36 |
| HM3 | 255 | 39 |
| HM4 | 289 | 34 |
| HM5 | 282 | 36 |
| HM6 | 275 | 35 |
| HM8 | 278 | 36 |
| HM9 | 269 | 36 |
| HM10 | 288 | 43 |
| HM11 | 262 | 36 |
| HM12 | 320 | 39 |
| HM13 | 247 | 38 |

The SGN and UI for a baseline product (no micronutrient addition) is 307 and 36 respectively. While the UI for the HM products is similar to the baseline the SGN is smaller. The average SGN of the HM products is 271.

Two breakage procedures were performed to compare HM products with the base line scenario. These were the conditioned and weathered breakage tests. The weathered breakage test is used to evaluate the hardness of a product that has been exposed to a relative humidity of 72% for 24 hours. The conditioned breakage test is used to evaluate product hardness after 24 hours of exposure to 26% relative humidity. The difference between the conditioned and weathered breakage values is assumed to be the amount of weathering that took place.

A test sample for each HM product of the same or similar sieve analysis was measured. For the weathered breakage test, the samples were exposed to the respective relative humidity for 24 hours. After a period of shaking, the quantity of broken sample was measured, i.e. the % of breakage retained on a specified sized mesh screen.

Figure 2:
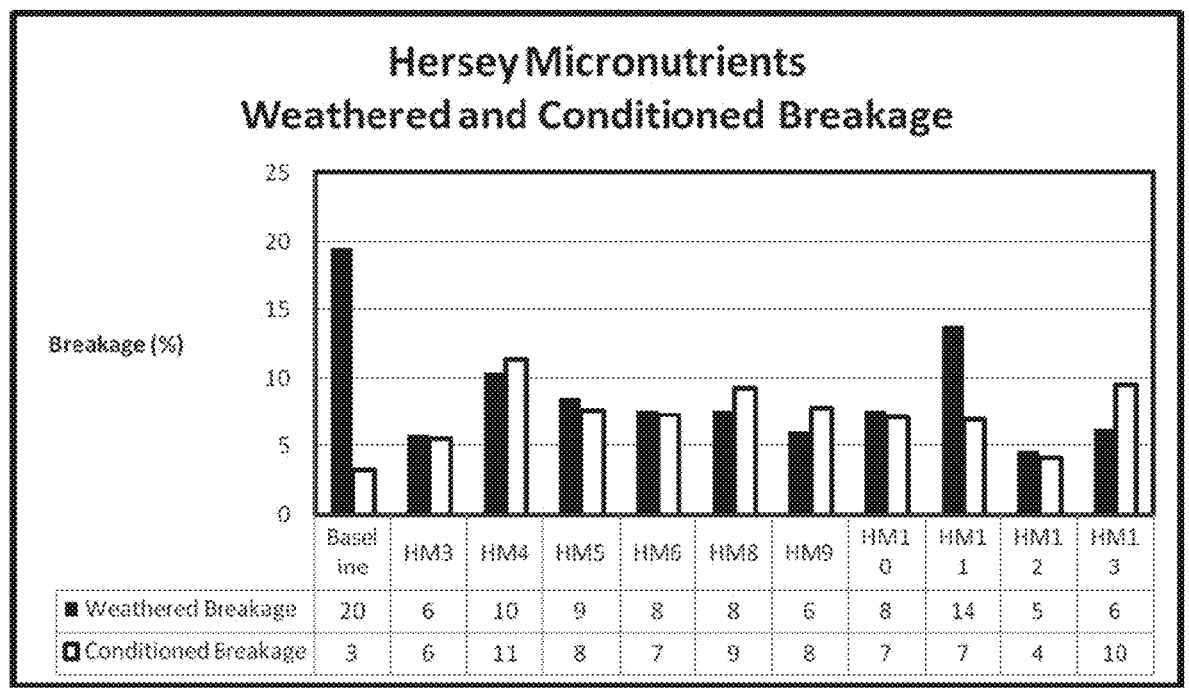
FIG. 2 is a graph displaying breakage results of Hersey 0-0-62 MOP (based on N—$P_2O_5$—$K_2O$) plus Micronutrient (HM) samples.

FIG. 2 displays that each of the HM products has an improved weathered breakage value compared to baseline while conditioned breakage shows slightly higher values compared to baseline. Breakage values in FIG. 2 do not indicate a concern for product quality; however they can be reduced if so desired using a binding agent.

In another series of breakage tests with Hersey's Ag-granular product, it was observed the breakage values could optionally be reduced to below 10% at 700 ppm SHMP binder addition (Table 5).

TABLE 5

Breakage Results of Hersey Granular

| | SHMP (ppm) | | | | | | |
|---|---|---|---|---|---|---|---|
| | 0 | 435 | 552 | 590 | 396 | 584 | 716 |
| Breakage % on 20 Mesh | 19.82 | 13.41 | 15.58 | 12.44 | 15.44 | 12.35 | 9.34 |

EXAMPLE 2

MOP feed material from Mosaic Carlsbad N. Mex. (also referred to as Dyna-K) was compacted with various micronutrients and evaluated for technical feasibility. MOP from Carlsbad is generated using conventional underground mining techniques. The MOP generated from this process is a 0-0-60% $K_2O$ product (expressed in terms of N—$P_2O_5$—$K_2O$) and is red in color as is the inherent nature of MOP produced from the underground mining technique.

The micronutrients added included 0.5 weight % boron (via 3.47 weight % $Na_2B_4O_7.5H_2O$), 1.0 weight % manganese (via 3.03% $MnSO_7.H_2O$), 1.0 weight % Zn (via 4.41 weight % $ZnSO_4.7H_2O$), 1.0 weight percent copper (via 4.10 weight % $CuSO_4.5H_2O$), 1.0 weight % iron (via 4.98 weight percent $FeSO_4.7H_2O$), and 0.05 weight % molybdenum (via 0.13 weight % $Na_2MoO_4.2H_2O$). Each of the runs was repeated with the addition of 5 weight % sulfur.

In the compaction method, initial ram pressures of 1000 psi and 2500 psi, wherein 1000 psi ram pressure corresponds to about 20,000 psi applied to the material being compacted, with the final product yields, i.e. percentage of actual final product compared to starting feed weight, being 51% and 75% respectively. It was noted that the dust levels were visually lower with the higher ram pressure, which was used for the test runs.

The boron and boron/sulfur combination products ran well, yielding 67% and 60% respectively. There were no negative effects from the products, and the products flowed well with no equipment issues.

The manganese sulfate and manganese sulfate/sulfur combination products resulted in a light negative effect on the feed screw with some stoppages, suggesting that the manganese had a binding effect on the force feeder. The yields were 67% and 64% respectively.

The zinc compound of the zinc sulfate and zinc sulfate/sulfur combination products has inherent surface moisture of about three to about five percent. This moisture migrates to the feed, making the feed moist which could potentially impact the flow rate in the hopper. However, the yields were not impacted, and the products demonstrated yields of 65% and 77% respectively.

The copper sulfate and copper sulfate/sulfur combination products were required different handling operations. While the copper had a damp texture, this moisture did not necessarily transfer to the feed upon mixing contrary to the observations with the zinc compound. The copper was received in flake form (¼" particles) that was pulverized before being blended into the feed. The feed rates were lowered to reduce the risk of binding the flights of the feed auger. Blue particles were observed in the final product.

Figure 3:
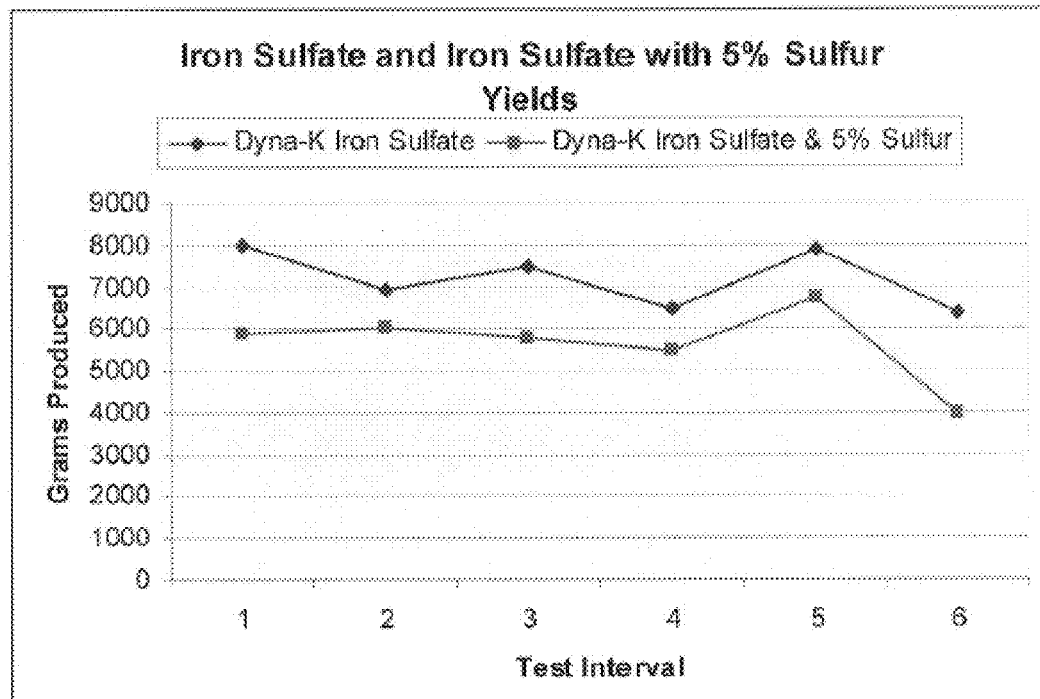
FIG. 3 is a graph displaying Production Yields of Carlsbad 0-0-60 MOP (based on N—$P_2O_5$—$K_2O$) plus micronutrient test product MOP using Sulfur.

The combination of iron sulfate and sulfur impacted the activity of the feed; however, the yields were higher when the iron compound was added without sulfur. This is illustrated in the graph of FIG. 3.

Figure 4:
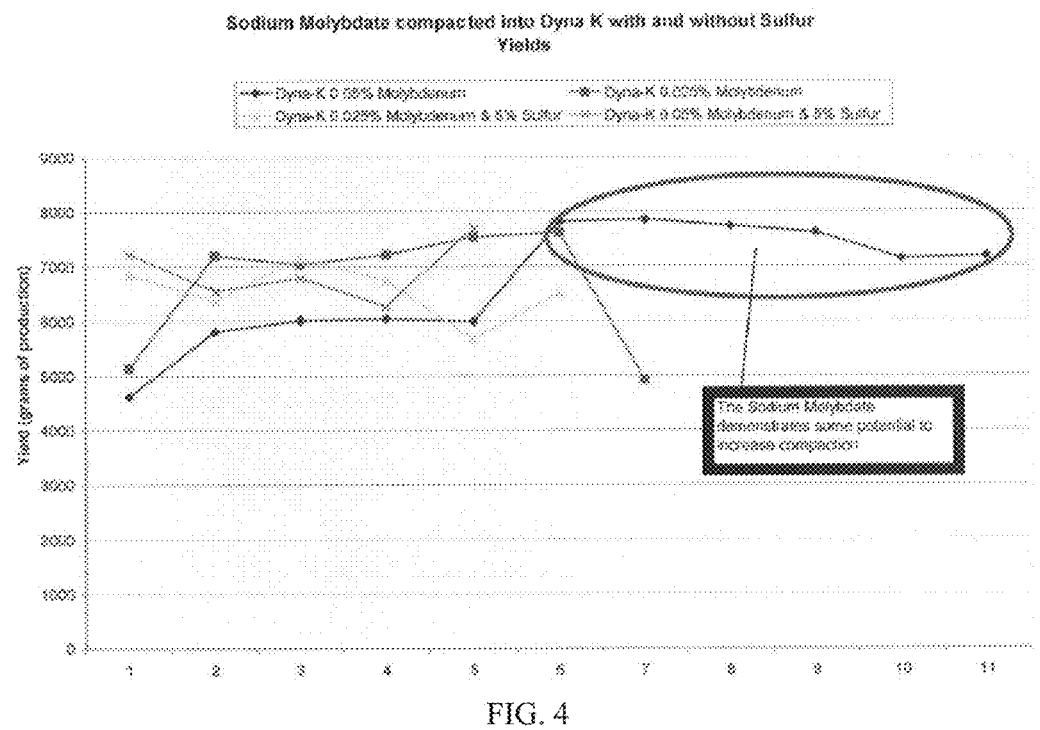
FIG. 4 is a graph displaying Production Yields of Carlsbad 0-0-60 MOP (based on N—$P_2O_5$—$K_2O$) plus micronutrient test product MOP using Molybdenum.

The sodium molybdate and sodium molybdate/sulfur combination were treated at two rates of 0.05 weight percent and 0.13 weight percent. Once the recycle came into the system, steady state was achieved and the yields increased and the run time surpassed normal operating time by about twenty minutes compacting even dust which is normally rejected. This is illustrated by the graph in FIG. 4 which compares the yield in grams of production to the test interval.

The sulfur compounds in general compacted into the MOP feed material generally well, and the flake yield was generally increased slightly by the addition of the sulfur.

The finished products were subjected to three quality tests including degradation (conditioned and weathered breakage), dusting tendency, and moisture absorption properties, discussed in more detail below. The zinc and zinc/sulfur products tended to have increased breakage characteristics, increased dusting, and increased moisture absorption as compared to the standard MOP product. Breakage and dust values can be further reduced if so desired using binding agents and alternate de-dusting treatment oils.

The iron and iron/sulfate products tended to turn black during moisture absorption testing and emitted a strong odor of hydrogen sulfide. The sulfur treated product generally had a lighter appearance than the non-sulfur product having the same additive.

Figure 5:
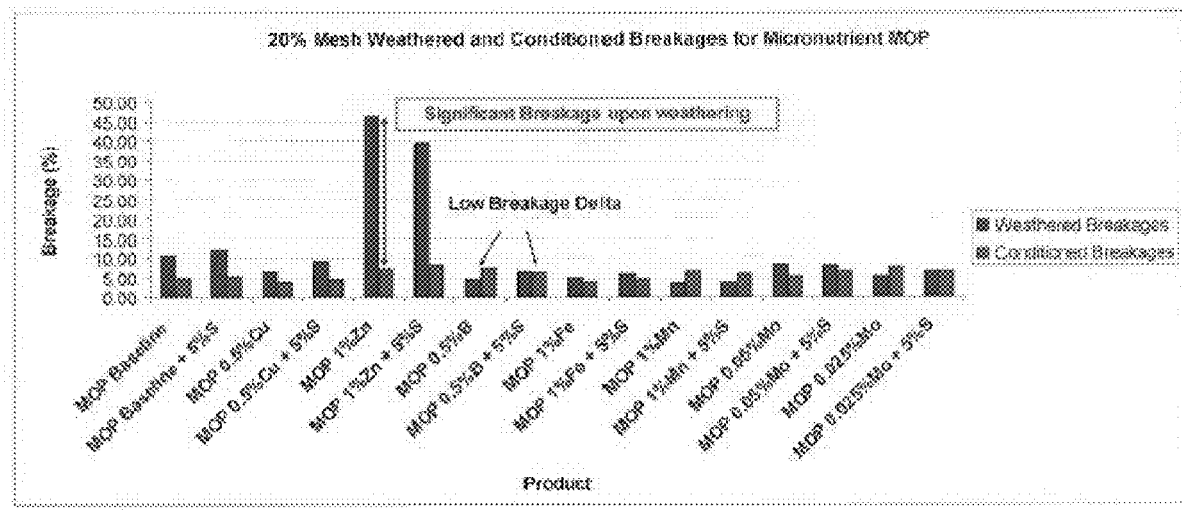
FIG. 5 is a graph displaying Breakage results of Carlsbad 0-0-60 MOP (based on N—$P_2O_5$—$K_2O$) plus micronutrient test product MOP.
Figure 6:
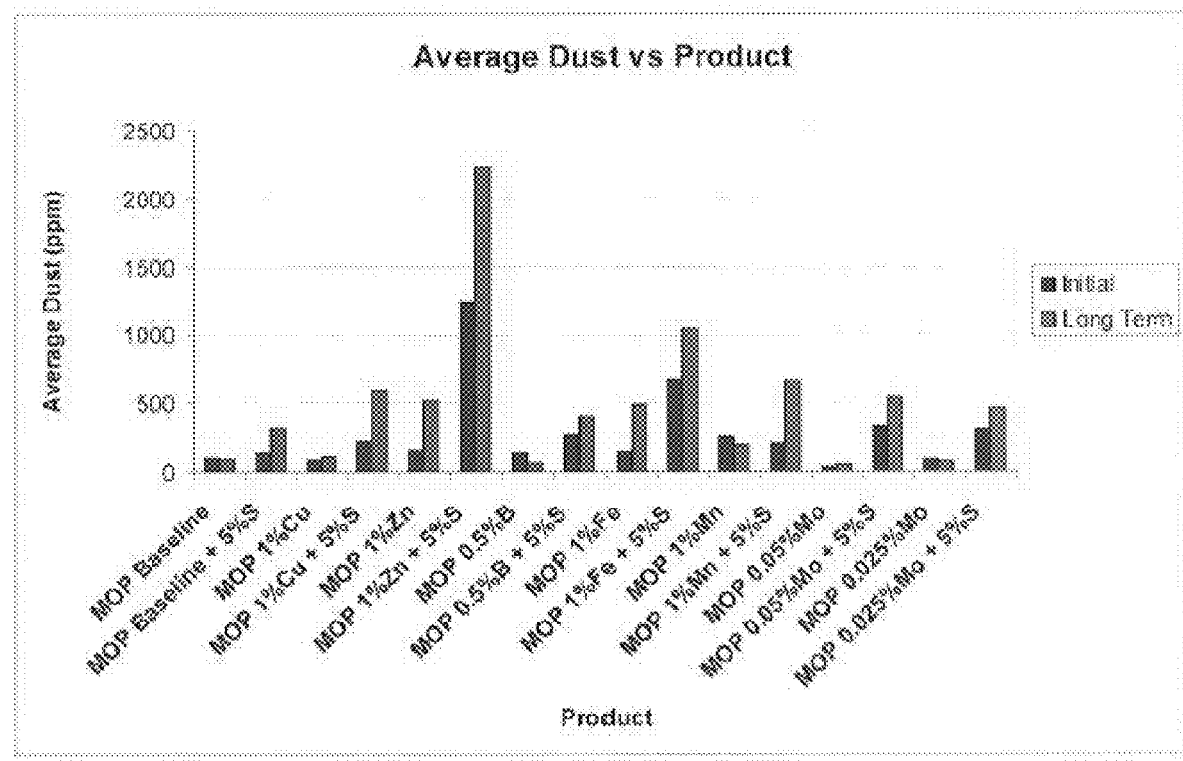
FIG. 6 is a graph displaying Dust results of Carlsbad 0-0-60 MOP (based on N—$P_2O_5$—$K_2O$) plus micronutrient test product MOP products.
Figure 7:
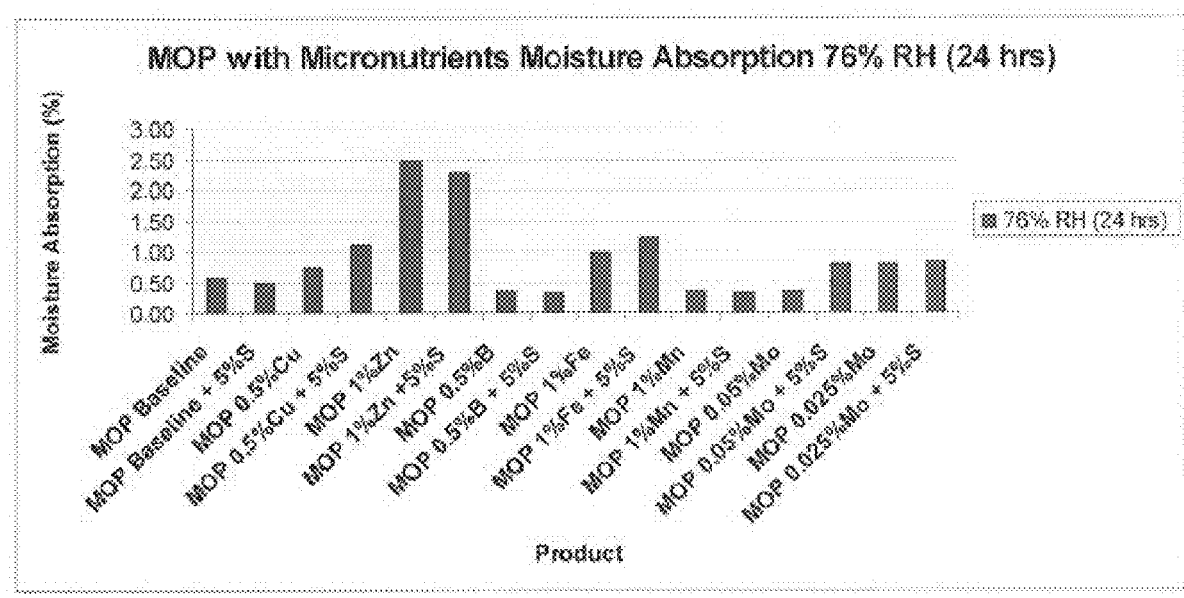
FIG. 7 is a graph displaying Moisture Absorption results of Carlsbad 0-0-60 MOP (based on N—$P_2O_5$—$K_2O$) plus micronutrient test product MOP.
Figure 8:
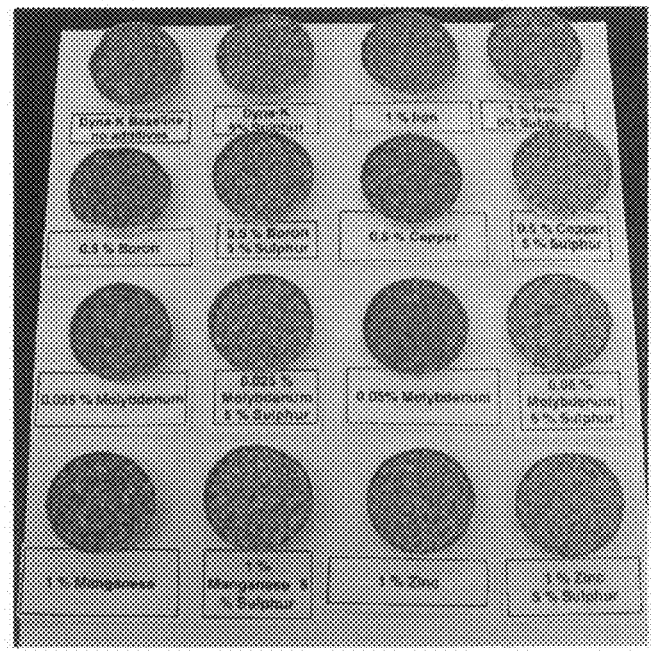
FIG. 8 is a picture of Final Carlsbad 0-0-60 MOP (based on N—$P_2O_5$—$K_2O$) plus micronutrient test product MOP.
Figure 9:
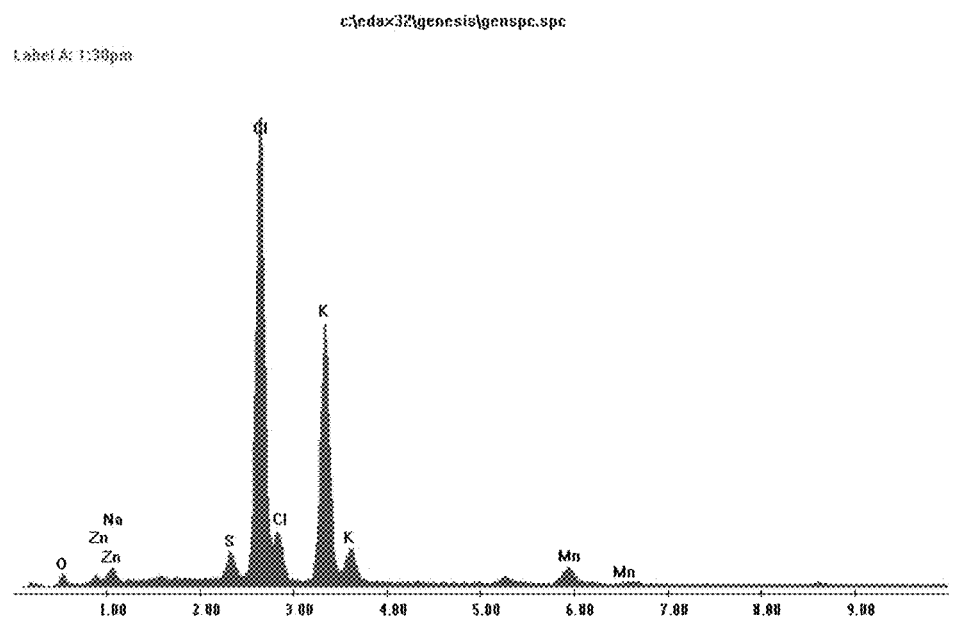
FIG. 9 is an Energy-Dispersive X-ray Spectroscope (EDS) spectrum of a sample of a granule of compacted MOP containing micronutrients according to an embodiment of the invention.
Figure 10:
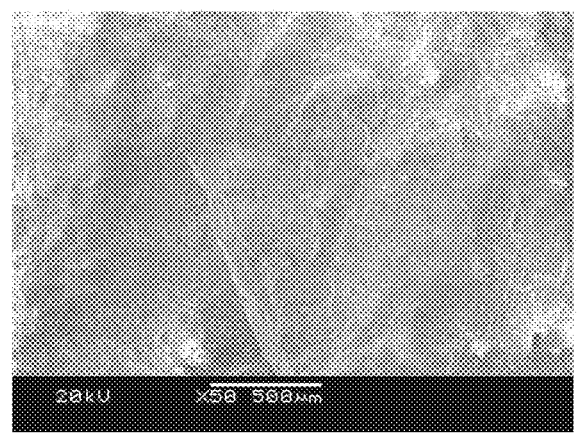
FIG. 10 is a Scanning Electron Microscope (SEM) micrograph of the sample of FIG. 9.
Figure 11A:
FIG. 11A is an EDS map of chlorine of the SEM of FIG. 10.
Figure 11B:
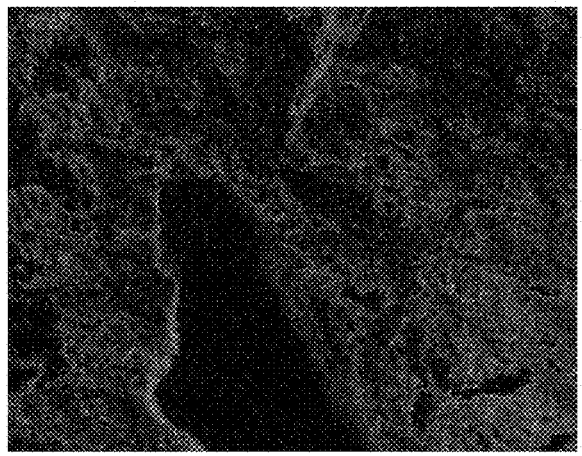
FIG. 11B is an EDS map of potassium of the SEM of FIG. 10.
Figure 11C:
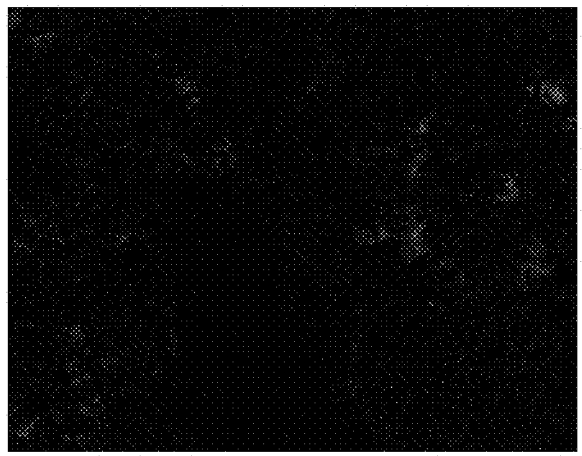
FIG. 11C is an EDS map of manganese of the SEM of FIG. 10.
Figure 11D:
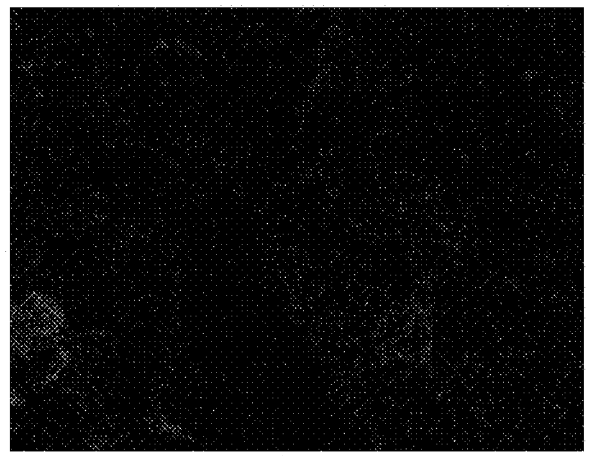
FIG. 11D is an EDS map of sodium of the SEM of FIG. 10.
Figure 11E:
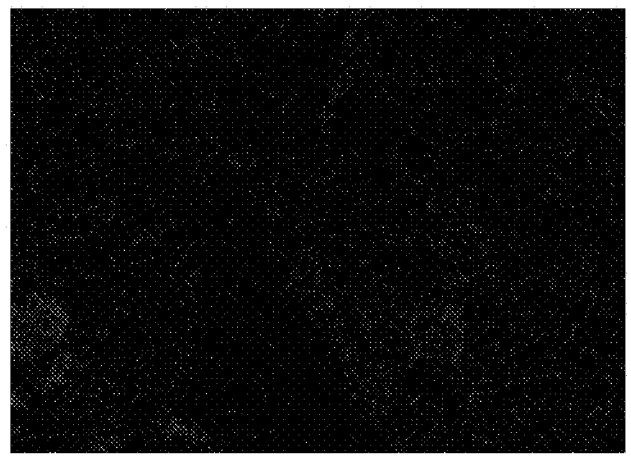
FIG. 11E is an EDS map of zinc of the SEM of FIG. 10.
Figure 11F:
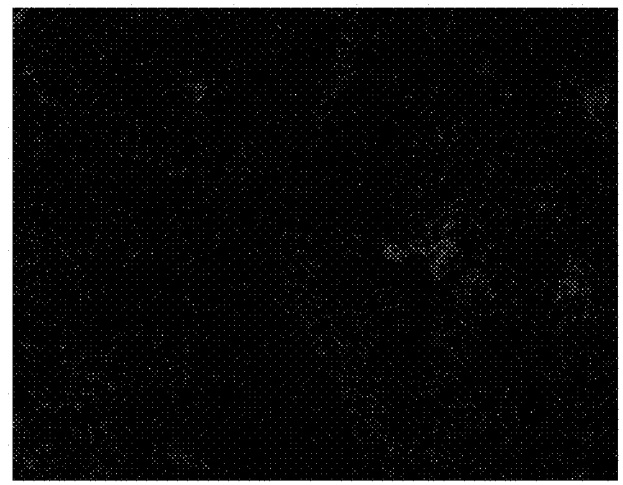
FIG. 11F is an EDS map of oxygen of the SEM of FIG. 10.
Figure 11G:
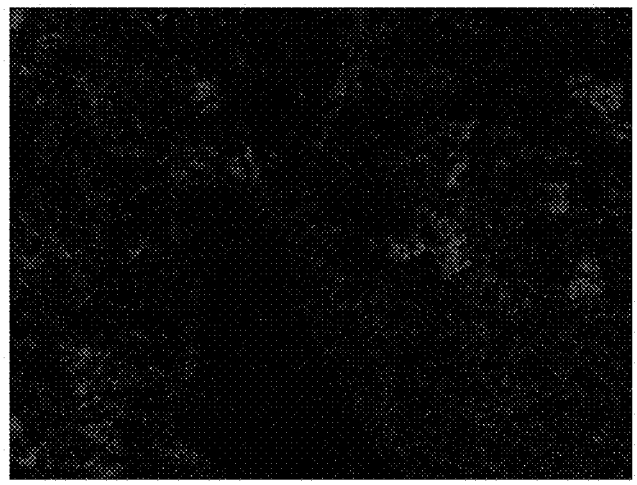
FIG. 11G is an EDS map of sulfur of the SEM of FIG. 10.
Figure 12A:
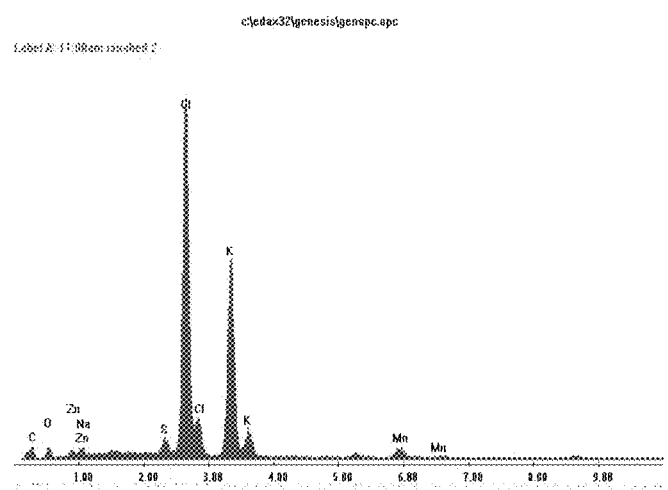
FIG. 12A is an EDS spectrum of a sample of a crushed granule of compacted MOP containing micronutrients according to an embodiment of the invention.
Figure 12B:
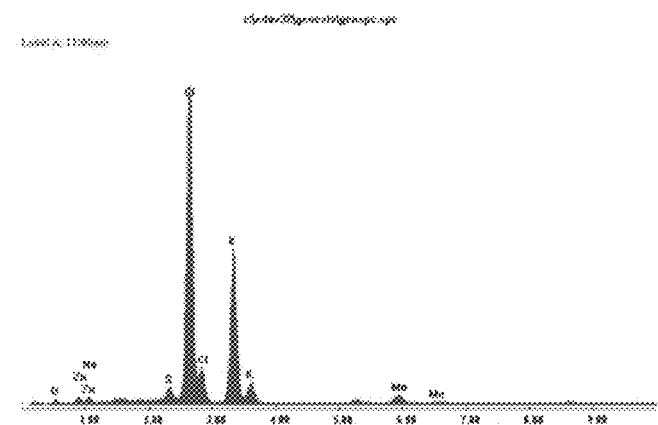
FIG. 12B is an EDS spectrum of a sample of the full granule of compacted MOP containing micronutrients of FIG. 12A.

The weathered and conditioned breakages are illustrated in FIG. 5, the dusting results are illustrated in FIG. 6, and the moisture absorption results are illustrated in FIG. 7. A visual comparison of all products is included in FIG. 8.

The moisture absorption test determines the critical relative humidity of a sample, which is defined as the relative humidity at which the moisture absorption of a sample sharply increases. The higher the critical relative humidity of a product, the less moisture the product absorbs thus maintaining better product integrity during handling and storage. Specifically, the moisture absorption test determines the amount of moisture absorbed by a product (as a weight percent gained) at various points in time at various humidity settings, such as, for example, 24 hours, 48 hours, and 72 hours when exposed to 26% relative humidity (RH), 40% RH, 60% RH, 72% RH, 76% RH, 80% RH, 85% RH, and 100% RH.

The dusting results are from a de-dust test which is an abrasion test used to study the degradation characteristics of a sample. Product abrasion is created by tumbling the product for a period of time with a number of steel balls. Air borne dust is drawn from the tumbler and weighed. The short term de-dust test is performed on samples that have been exposed to 40% RH for 24 hours, while the long term de-dust test is performed on samples that have been exposed to seven days of 24 hour cycling between 26 and 72% RH.

EXAMPLE 3

MOP feed supplied from Mosaic Potash Esterhazy K1 in Esterhazy, Saskatchewan, Canada (hereinafter "Mosaic K1" or "K1") was compacted with various micronutrients in two separate systems and evaluated for technical feasibility. This example documents the testing and results from testwork performed by a third party compaction tolling facility. The chemical analysis of the MOP is typically 96.25% by weight of KCl, 2.87% by weight of sodium chloride (NaCl), 300 ppm of calcium (Ca), 300 ppm of magnesium (Mg), and 600 ppm of sulfate ($SO_4$). The total moisture content of the MOP feed is typically 0.02% by weight at 130° C. The MOP feed supplied from Mosaic K1 is a 0-0-60% K2O product (expressed in terms of N—$P_2O_5$—$K_2O$) and is generated using conventional underground mining techniques. The MOP generated from this process is red/pink in color as is the inherent nature of MOP produced from the underground mining technique.

The micronutrients used in this production of the K1 Micronutrient (EM) samples (Table 6 below) included boron (in the form of anhydrous borax $Na_2B_4O_7$), zinc (in the form of zinc sulfate monohydrate $ZnSO_4.H_2O$), and manganese (in the form of manganese Sulfate monohydrate $MnSO_4.H_2O$).

The following compositions were produced (hereinafter "the EM products"):

TABLE 6

Test Run Micronutrient Description

| Sample | Micronutrient Compounds | Micronutrients (%) |
|---|---|---|
| EM-1 | $Na_2B_4O_7$-anhydrous borax | 0.5% B |
| EM-2 | $ZnSO_4$•$H_2O$-zinc sulfate monohydrate | 1% Zn |
| EM-3 | (#1) $MnSO_4$•$H_2O$-manganese sulfate monohydrate- | 1% Mn—1% Zn |
|  | (#2) $ZnSO_4$•$H_2O$-zinc sulfate monohydrate |  |
| EM-4 | (#1) $MnSO_4$•$H_2O$-manganese sulfate monohydrate- | 2% Mn—1% Zn |
|  | (#2) $ZnSO_4$•$H_2O$-zinc sulfate monohydrate |  |
| EM-5 | $MnSO_4$•$H_2O$-manganese sulfate monohydrate | 1% Mn |
| EM-6 | $MnSO_4$•$H_2O$-manganese sulfate monohydrate | 2% Mn |

Each of these products was generated using the same process flow sheet (FIG. 1). The MOP and micronutrient(s) were blended in a batch mixing drum. The blended product was then heated and delivered to the compaction circuit. The compaction circuit consisted of a compactor producing a sinusoidal flake, a flake breaker, a disintegrator and a two-deck vibratory screen providing a 4×10 Tyler Mesh product. In this circuit, oversized and undersized particles were recycled for further processing.

In the compaction method, a ram pressure of 1000 psi was used, wherein 1000 psi ram pressure corresponds to approximately 20,000 psi applied to the material being compacted. Product yields ranged from 29.3% to 34.4%. There were no negative effects on production parameters from the micronutrient products, and the products flowed well with no equipment issues.

Samples from each of the EM products were analyzed for micronutrient (boron, zinc and manganese) content by an outside independent laboratory. The micronutrients found in anhydrous borax, manganese sulfate monohydrate and zinc sulfate monohydrate are effectively entrained in a compacted granule.
Results are Shown in Table 7.

TABLE 7

Micronutrients Analysis of the EM Products

| Sample | Micronutrient Compounds | Micronutrients (%) Addition | Micronutrients (%) Analytical |
|---|---|---|---|
| EM-1$_1$ | Na$_2$B$_4$O$_7$-anhydrous borax | 0.5% B | 0.46% B |
| EM-1$_2$ | Na$_2$B$_4$O$_7$-anhydrous borax | 0.5% B | 0.41% B |
| EM-2$_1$ | ZnSO$_4$•H$_2$O-zinc sulfate monohydrate | 1% Zn | 0.67% Zn |
| EM-2$_2$ | ZnSO$_4$•H$_2$O-zinc sulfate monohydrate | 1% Zn | 0.45% Zn |
| EM-3 | (#1) MnSO$_4$•H$_2$O-manganese sulfate monohydrate-(#2) ZnSO$_4$•H$_2$O-zinc sulfate monohydrate | 1% Mn—1% Zn | 0.79% Mn—0.69% Zn |
| EM-4 | (#1) MnSO$_4$•H$_2$O-manganese sulfate monohydrate-(#2) ZnSO$_4$•H$_2$O-zinc sulfate monohydrate | 2% Mn—1% Zn | 1.77% Mn—0.76% Zn |
| EM-5 | MnSO$_4$•H$_2$O-manganese sulfate monohydrate | 1% Mn | 0.85% Mn |
| EM-6 | MnSO$_4$•H$_2$O-manganese sulfate monohydrate | 2% Mn | 1.62% Mn |

Some adjustments to the dust removal systems may be required as smaller size micronutrients may be taken out with the dust. Each of the EM products was screened in order to perform a size analysis. Table 8 below displays the Size Guide Number (SGN) and the Uniformity Index (UI) of each of the product streams along with a baseline.

TABLE 8

SGN and UI of EM Products

|  | SGN | UI |
|---|---|---|
| Baseline$_1$ | 292 | 42 |
| Baseline$_2$ | 280 | 41 |
| EM-1$_1$ | 293 | 43 |
| EM-1$_2$ | 270 | 43 |
| EM-2$_1$ | 289 | 43 |
| EM-2$_2$ | 294 | 41 |
| EM-3 | 283 | 42 |
| EM-4 | 277 | 43 |
| EM-5 | 277 | 43 |
| EM-6 | 252 | 41 |

The SGN and UI for the baseline products (no micronutrient addition) were 292/280 and 42/41 respectively. While the UI for the EM products is similar to the baseline, there is some variation with the SGN values. The average SGN of the EM products is 279. By maintaining the SGN and UI at acceptable levels, less segregation is generated, resulting in better distribution of the micronutrients in the field and increased accessibility of micronutrients to each plant.

The finished products were treated with de-dust oil and subjected to initial and long term dusting tendency tests for quality purposes. The dust percentage results are displayed below in Table 9.

TABLE 9

Initial & Long Term Dust Results of EM Products

|  | Initial Dust (%) | Long Term Dust (%) |
|---|---|---|
| Baseline | 0.0535 | 0.1534 |
| EM-1 | 0.1010 | 0.1865 |
| EM-2 | 0.0330 | 0.0330 |
| EM-3 | 0.1101 | 0.1120 |
| EM-4 | 0.1760 | 0.2280 |
| EM-5 | 0.1490 | 0.1260 |
| EM-6 | 0.1480 | 0.2400 |

It was observed that from these tests, the addition of zinc only (EM-2) improved the dusting values from the baseline but did absorb more moisture during the cycling period of this test and product was visually noted to be setting up during the experimental process. Manganese combinations with Zinc (EM-3 and EM-4) did not exhibit such hygroscopic properties. Meanwhile the addition of boron (EM-1) produced more dusts (particularly in the long term), while the remainder of the samples (which all contain manganese) showed the poorest results in terms of both initial and long term dusts. However, although some dust values may be higher than desired, they can be reduced if so desired using binding agents and alternate dedusting treatment oils.

EXAMPLE 4

MOP feed supplied from Mosaic Potash Esterhazy K1 in Esterhazy, Saskatchewan, Canada (hereinafter "Mosaic K1" or "K1") was compacted with various micronutrients in two separate systems and evaluated for technical feasibility. This example documents the testing and results for plant scale testwork performed at the Mosaic K1 facility. Again, the chemical analysis of the MOP is typically 96.25% by weight of KCl, 2.87% by weight of sodium chloride (NaCl), 300 ppm of calcium (Ca), 300 ppm of magnesium (Mg), and 600 ppm of sulfate (SO$_4$). The total moisture content of the MOP feed is typically 0.02% by weight at 130° C. The MOP feed supplied from Mosaic K1 is a 0-0-60% K2O product (expressed in terms of N—P$_2$O$_5$—K$_2$O) and is generated using conventional underground mining techniques. The MOP generated from this process is red/pink in color as is the inherent nature of MOP produced from the underground mining technique.

The micronutrients used in this production of the K1 Micronutrient (EM) samples (Table 10 below) included zinc (in the form of zinc sulfate monohydrate ZnSO$_4$.H$_2$O), and manganese (in the form of manganese sulfate MnSO$_4$.H$_2$O). The following compositions were produced (hereinafter "the EM products"):

TABLE 10

Test Run Micronutrient Description

| Sample | Micronutrients | Micronutrients (%) |
|---|---|---|
| EM-4 | (#1) MnSO$_4$•H$_2$O-manganese sulfate monohydrate-(#2) ZnSO$_4$•H$_2$O-zinc sulfate monohydrate | 2% Mn—1% Zn |

During manufacture, two micronutrients were transported from bins in two separate augers controlled by variable frequency drives. These augers fed a mixing screw conveyor which mixed the two micronutrients with pre-heated MOP and delivered the mixture into the compaction system. The compaction circuit consisted of a compactor producing a sinusoidal flake, a flake breaker, a crusher and a two-deck vibratory screen providing a 4×8 or 4×9 Tyler Mesh product. In this circuit, oversized and undersized granules were recycled for further processing. This circuit also used a finishing/polishing screen that provided a 4.5×8 Tyler Mesh product.

Eleven samples of the EM-4 product were analyzed for micronutrient (zinc and manganese) content by an outside independent laboratory. The zinc and manganese micronutrients were found to be entrained in a compacted granule. Results are Shown in Table 11.

TABLE 11

Micronutrients Analysis of the EM Products

| Sample | Micronutrient Compounds | Micronutrients (%) Addition | Micronutrients (%) Analytical |
|---|---|---|---|
| EM-4$_1$ | (#1) MnSO$_4$•H$_2$O-manganese sulfate monohydrate- (#2) ZnSO$_4$•H$_2$O-zinc sulfate monohydrate | 2% Mn—1% Zn | 1.45% Mn—0.79% Zn |
| EM-4$_2$ | (#1) MnSO$_4$•H$_2$O-manganese sulfate monohydrate- (#2) ZnSO$_4$•H$_2$O-zinc sulfate monohydrate | 2% Mn—1% Zn | 2.03% Mn—1.01% Zn |
| EM-4$_3$ | (#1) MnSO$_4$•H$_2$O-manganese sulfate monohydrate- (#2) ZnSO$_4$•H$_2$O-zinc sulfate monohydrate | 2% Mn—1% Zn | 1.89% Mn—0.99% Zn |
| EM-4$_4$ | (#1) MnSO$_4$•H$_2$O-manganese sulfate monohydrate- (#2) ZnSO$_4$•H$_2$O-zinc sulfate monohydrate | 2% Mn—1% Zn | 1.93% Mn—1.06% Zn |
| EM-4$_5$ | (#1) MnSO$_4$•H$_2$O-manganese sulfate monohydrate- (#2) ZnSO$_4$•H$_2$O-zinc sulfate monohydrate | 2% Mn—1% Zn | 1.54 % Mn—0.85% Zn |
| EM-4$_6$ | (#1) MnSO$_4$•H$_2$O-manganese sulfate monohydrate- (#2) ZnSO$_4$•H$_2$O-zinc sulfate monohydrate | 2% Mn—1% Zn | 1.50% Mn—0.85% Zn |
| EM-4$_7$ | (#1) MnSO$_4$•H$_2$O-manganese sulfate monohydrate- (#2) ZnSO$_4$•H$_2$O-zinc sulfate monohydrate | 2% Mn—1% Zn | 1.85% Mn—0.97% Zn |
| EM-4$_8$ | (#1) MnSO$_4$•H$_2$O-manganese sulfate monohydrate- (#2) ZnSO$_4$•H$_2$O-zinc sulfate monohydrate | 2% Mn—1% Zn | 1.83% Mn—0.95% Zn |
| EM-4$_9$ | (#1) MnSO$_4$•H$_2$O-manganese sulfate monohydrate- (#2) ZnSO$_4$•H$_2$O-zinc sulfate monohydrate | 2% Mn—1% Zn | 1.60% Mn—0.87% Zn |
| EM-4$_{10}$ | (#1) MnSO$_4$•H$_2$O-manganese sulfate monohydrate- (#2) ZnSO$_4$•H$_2$O-zinc sulfate monohydrate | 2% Mn—1% Zn | 1.83% Mn—0.96% Zn |
| EM-4$_{11}$ | (#1) MnSO$_4$•H$_2$O-manganese sulfate monohydrate- (#2) ZnSO$_4$•H$_2$O-zinc sulfate monohydrate | 2% Mn—1% Zn | 1.03% Mn—0.57% Zn |

Again there are differences between the concentrations of micronutrients added and those in the final product. Additional adjustments can be done to the dust removal systems as it is believed that micronutrients may be escaping the system with the dust losses. Additionally or alternatively, the micronutrients may have to be over formulated to ensure target concentrations are met.

Seven samples of the EM-4 product were screened in order to perform a size analysis. Table 12 below displays the Size Guide Number (SGN) and the Uniformity Index (UI) of each of the product streams along with a baseline.

TABLE 12

SGN and UI of EM Products

| | SGN | UI |
|---|---|---|
| EM-4$_1$ | 307 | 56 |
| EM-4$_2$ | 302 | 55 |
| EM-4$_3$ | 294 | 50 |
| EM-4$_4$ | 291 | 56 |
| EM-4$_5$ | 315 | 56 |
| EM-4$_6$ | 295 | 56 |
| EM-4$_7$ | 284 | 56 |

The typical SGN and UI for the baseline product (no micronutrient addition) are 300 and 50 respectively. Results show a properly sized cohered granular particle that is suitable for blending or direct application in order to get even distribution of micronutrient components in the field.

Nine samples of the finished EM-4 product were subjected to quality testing including degradation (breakage) and moisture absorption properties. The results of both tests can be observed below in Table 13.

TABLE 13

Quality Test Results for EM-4 Products

| | Moisture % (Ranges 0-0.10%) | Breakage % |
|---|---|---|
| EM-4$_1$ | 0.05 | 12.0 |
| EM-4$_2$ | 0.05 | 11.5 |
| EM-4$_3$ | 0.07 | 11.8 |
| EM-4$_4$ | 0.06 | 10.5 |
| EM-4$_5$ | 0.05 | 12.1 |
| EM-4$_6$ | 0.05 | 12.1 |
| EM-4$_7$ | 0.06 | 11.4 |
| EM-4$_8$ | 0.05 | 11.2 |
| EM-4$_9$ | 0.06 | 11.6 |

Results indicate moisture and product breakage are not significantly impacted after the micronutrients have been entrained into each fertilizer particle.

Scanning Electron Microscope and Energy-Dispersive X-Ray Spectroscope

Referring to FIGS. 9-12B, four samples of the cohered granular MOP EM fertilizer products containing micronutrients from Example 4 were run on the Scanning Electron Microscope (SEM) and Energy-Dispersive X-ray Spectroscope (EDS) at an independent, outside laboratory. Samples were analyzed to determine the relative proportions and distributions of each element of interest within an individual granule and ensure even distribution of the micronutrients with each cohered MOP+micronutrient particle. One of these samples was then crushed and scanned again to compare the results to the scans obtained from the same sample in granular form. Images were gathered for each sample then analyzed by the EDS to first produce a spectrum identifying the distribution of the components potassium (K), chlorine (CO, sodium (Na), zinc (Zn), manganese (Mn), sulfur (S), and oxygen (O) and then creating a visual map of each element on the SEM image. The micrographs and EDS scan are shown in FIGS. 9-12B.

An EDS scan of an SEM image can determine the presence of an element and can provide an idea of the relative proportion of the elements in a sample, although quantitative results cannot be determined by EDS. It should be noted that zinc in its Zn2+ state (added as ZnSO4) emits a lower-energy response which reads at the same energy level as the response generated from Na. Since the samples of Granular MOP containing micronutrients are expected to have both Na and Zn2+, it cannot be determined which element is responsible for the peaks read on the spectra. All results labeled Zn and Na should therefore be considered as a composite of Zn and Na.

Referring to FIGS. 9 and 11A-F, all five samples showed consistent results and contained all likely components without any significant amount of unexpected elements. From the EDS results shown in FIGS. 9 and 11A-F, it can be seen that the expected high proportions of K and Cl. As mentioned previously, the responses labeled "Zn" and "Na" should be considered together to show the presence of Zn and Na. However, since both Zn and Mn are added in sulfate (SO4) form, the EDS maps of O and S (FIGS. 11F and 11G) can be compared to the EDS map of Mn (FIG. 11B) to see that there are areas where S and O are present where there is not a response from Mn. By this comparison, it is reasonable to deduce that these sulfate responses are due to the zinc sulfate.

As illustrated in the maps of FIGS. 11A-11F, the distribution of components, specifically Zn and Mn, is fairly even with only small areas of higher concentration of approximately ≤100 μm in size. Since there is agreement in the values of the crushed and granular forms of the same sample (see FIGS. 12A-12B) it can be inferred that the distribution of the components is likely uniform throughout the sample.

During the scanning, a quick overview of the entire sample was completed and confirmed that there were no large deposits (i.e. full granule) visible in the sample subsets.

Results from the SEM and EDS scans confirm that distribution and relative proportions of the constituents of the Granular MOP containing micronutrient are uniform and consistent among samples. The distribution of the manganese and sulfates can be confirmed with good confidence and can be used to suggest the distribution of zinc. Uniform distribution of micronutrients within each granule results in better distribution of the micronutrients in the field and greater availability of micronutrients to each plant.

The invention may be embodied in other specific forms without departing from the essential attributes thereof; therefore, the illustrated embodiments should be considered in all respects as illustrative and not restrictive.

What is claimed is:

1. A cohered and compacted muriate of potash (MOP) fertilizer product comprising a plurality of fertilizer granules, each individual granule comprising:
   a source of potassium chloride comprising MOP containing from about 48.0 weight percent to about 62.0 weight percent $K_2O$;
   a phosphate-containing binding agent; and
   a source of zinc compacted with the source of potassium chloride, wherein the source of zinc provides zinc in an amount from about 0.001 to less than 1.0 weight percent of the granule.

2. The product of claim 1, wherein the source of zinc comprises zinc sulfate, zinc oxide, or both.

3. The product of claim 2, wherein the source of zinc comprises zinc sulfate.

4. The product of claim 2, wherein the source of zinc comprises zinc oxide.

5. The product of claim 1, wherein the MOP has a chemical profile of either 0-0-60 weight percent $K_2O$ or a 0-0-62 weight percent $K_2O$ based on a $N—P_2O_5—K_2O$ convention.

6. The product of claim 5, wherein the MOP has a chemical profile of 0-0-60 weight percent $K_2O$ based on the $N—P_2O_5—K_2O$ convention.

7. The product of claim 6, wherein the MOP has a chemical profile of 0-0-62 weight percent $K_2O$ based on the $N—P_2O_5—K_2O$ convention.

8. The product of claim 1, wherein each granule further comprises, in addition to the source of zinc, a micronutrient or secondary nutrient selected from the group consisting of: boron (B), manganese (Mn), molybdenum (Mo), nickel (Ni), iron (Fe) copper (Cu), sulfur (S) in its elemental form, sulfur in its oxidized sulfate form ($SO_4$), and combinations thereof.

9. The product of claim 8, wherein the micronutrient or secondary nutrient is present in the product in a range from about 0.001 to about 10 weight percent.

10. The product of claim 1, wherein the binding agent is selected from the group consisting of sodium hexametaphosphate (SHMP), tetra-sodium pyrophosphate (TSPP), tetra-potassium pyrophosphate (TKPP), sodium tri-polyphosphate (STPP); di-ammonium phosphate (DAP), mono-ammonium phosphate (MAP), granular mono-ammonium phosphate (GMAP), and combinations thereof.

11. A method of producing a cohered fertilizer product including granules containing zinc, the method comprising:
   combining a source of potassium chloride, a phosphate-containing binding agent, and a source of zinc to form a composition, wherein the source of potassium chloride comprises muriate of potash (MOP) containing from about 48.0 weight percent to about 62.0 weight percent $K_2O$, and wherein the source of zinc is added in an amount such that the composition contains zinc in an amount of about 0.001 weight percent to less than 1.0 weight percent;
   compacting the composition; and
   crushing the compacted composition into granules.

12. The method of claim 11, further comprising:
   classifying the granules by size.

13. The method of claim 12, wherein a size distribution of the granules is substantially uniform, and wherein granules which are non-conforming are resized until conformance.

14. The method of claim 11, wherein the method further comprises combining with the source of potassium chloride, in addition to the source of zinc, a micronutrient or secondary nutrient selected from the group consisting of boron (B), manganese (Mn), molybdenum (Mo), nickel (Ni), copper (Cu), sulfur (S) in its elemental form, sulfur in its oxidized sulfate form (SO$_4$), and combinations thereof.

15. The method of claim 14, wherein the source of zinc and the micronutrient or secondary nutrient is added to the source of potassium chloride as separate streams and blended with the source of potassium chloride before compaction.

16. The method of claim 14, wherein the source of zinc and the micronutrient or secondary nutrient is blended in bulk before addition to the potassium chloride.

17. The method of claim 11, wherein the binding agent is selected from the group consisting of sodium hexametaphosphate (SHMP), tetra-sodium pyrophosphate (TSPP), tetra-potassium pyrophosphate (TKPP), sodium tri-polyphosphate (STPP); di-ammonium phosphate (DAP), mono-ammonium phosphate (MAP), granular mono-ammonium phosphate (GMAP), and combinations thereof.

18. The method of claim 14, wherein the micronutrient or secondary nutrient is present in the composition in a range from about 0.001 to about 10 weight percent.

* * * * *